United States Patent [19]

Ely et al.

[11] Patent Number: 5,419,833
[45] Date of Patent: May 30, 1995

[54] APPARATUS FOR TREATMENT OF WASTEWATER

[75] Inventors: Stephen R. Ely; George P. Olsen, both of Naperville, Ill.

[73] Assignee: Amoco Corporation, Chicago, Ill.

[21] Appl. No.: 120,660

[22] Filed: Sep. 13, 1993

Related U.S. Application Data

[60] Continuation of Ser. No. 601,201, Oct. 19, 1990, abandoned, which is a continuation of Ser. No. 295,229, Jan. 9, 1989, abandoned, which is a division of Ser. No. 65,955, Jun. 24, 1987, Pat. No. 4,826,600.

[51] Int. Cl.⁶ .................................................. C02F 3/30
[52] U.S. Cl. ................................................ 210/195.1
[58] Field of Search ........ 210/603, 607, 609, 612–615, 210/622, 629–631, 718, 750, 903, 188, 195.1, 218

[56] References Cited

U.S. PATENT DOCUMENTS

| | | | |
|---|---|---|---|
| 3,981,800 | 9/1976 | Ort | 210/603 |
| 4,040,953 | 8/1977 | Ort | 210/603 |
| 4,311,563 | 1/1982 | Benjes | 210/603 |
| 4,315,923 | 2/1982 | Witt et al. | 210/631 X |
| 4,351,724 | 9/1982 | Witt et al. | 210/603 |
| 4,351,739 | 9/1982 | Witt et al. | 210/603 |
| 4,375,412 | 3/1983 | Schimel | 210/603 |
| 4,530,762 | 7/1985 | Love | 210/603 |
| 4,532,042 | 7/1985 | Aivasidis | 210/603 |
| 4,696,747 | 9/1987 | Verstraete et al. | 210/603 X |
| 4,735,723 | 4/1988 | Mulder | 210/603 |
| 4,735,724 | 4/1988 | Chynoweth et al. | 210/603 |

FOREIGN PATENT DOCUMENTS

| | | |
|---|---|---|
| 55-15279 | 2/1980 | Japan . |
| 743953 | 1/1977 | U.S.S.R. . |

Primary Examiner—Thomas Wyse
Attorney, Agent, or Firm—Mary Jo Kanady; Norval B. Galloway; Wallace L. Oliver

[57] ABSTRACT

A method and apparatus for an anaerobic process to reduce caustic requirements and to facilitate dissolution of organic acid having limited solubility by combining effluent from an anaerobic reactor having dissolved carbon dioxide with fresh feed containing the organic acid and stripping the carbon dioxide from the mixture to raise the pH.

1 Claim, 2 Drawing Sheets

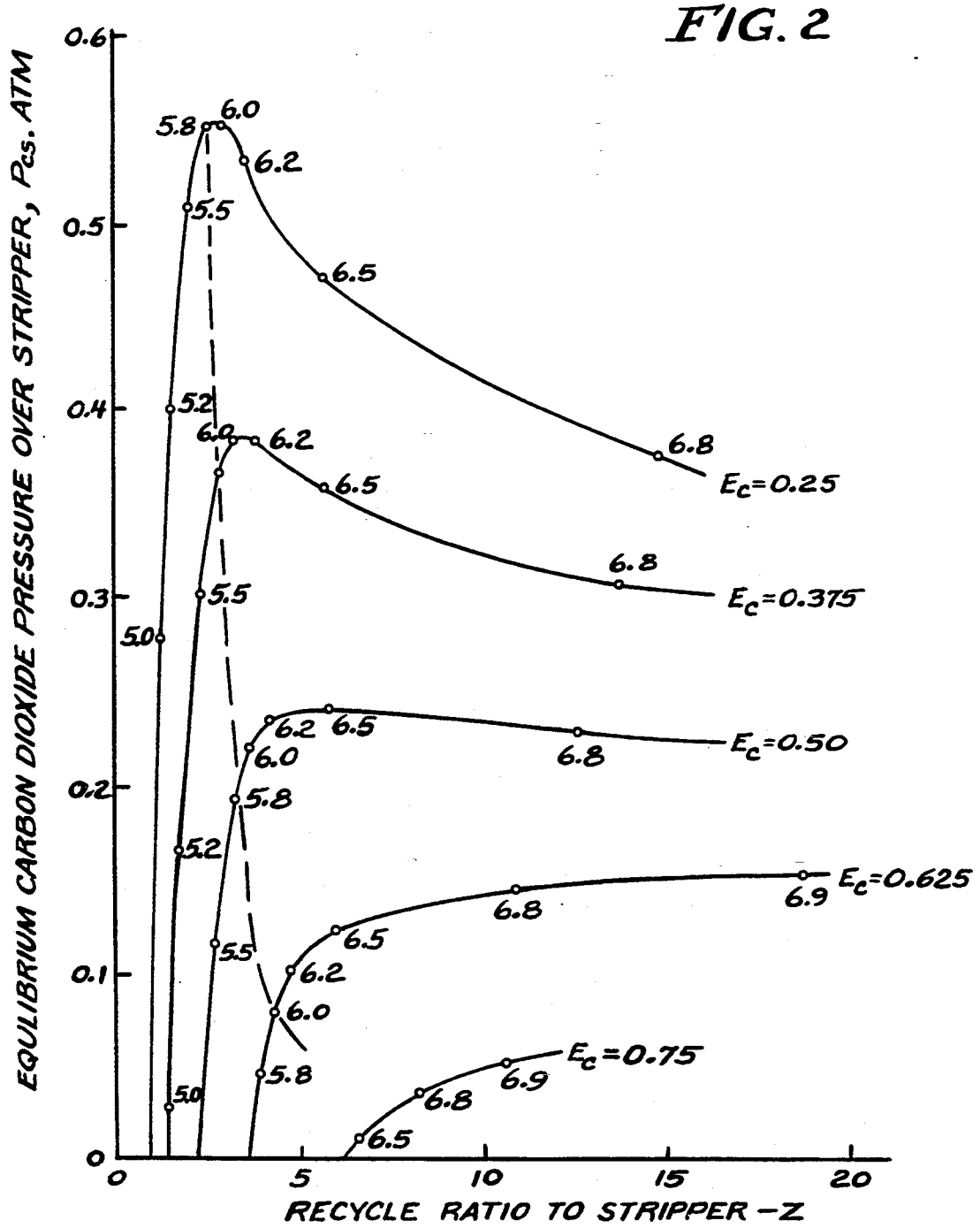

APPARATUS FOR TREATMENT OF WASTEWATER

This is a continuation of application Ser. No. 07/601,201, filed Oct. 19, 1990, abandoned which is a continuation of Ser. No. 295,229 filed Jan. 9, 1989, abandoned which is a divisional of Ser. No. 65,955 filed Jun. 24, 1987 and issued as U.S. Pat. No. 4,826,600 on May 2, 1989.

BACKGROUND OF THE INVENTION

The present invention relates to the treatment of wastewater or sewage so as to remove oxygen-demanding impurities prior to the release of the wastewater effluent into the environment. More particularly, the present invention relates to a process and an apparatus for reducing caustic demand as organic constituents in an anaerobic process stream are metabolized to methane and carbon dioxide.

A number of industries produce a wastewater solution which is acidic in content. The wastewater solution can be high in organic constituents and is generally unacceptable for disposition in a lake or river because of the high oxygen demand associated with the waste. Environmental laws and regulations place limits on the amount of chemical and biological oxygen-demanding substances that can be present in wastewater before such water is allowed to flow into public waterways.

One method of removing chemical and biological oxygen-demanding substances, is through metabolic degradation of the substances by bacteria in aerobic and anaerobic processes. The present invention pertains primarily to anaerobic processes with special application to acidic wastewaters of limited solubility.

In a typical anaerobic filter process, wastewater is directed through an anaerobic reactor wherein microorganisms within an anaerobic medium metabolize the organic substrate in the waste and produce methane and carbon dioxide. Typically, the reactor is a substantially closed containment vessel adapted to receive a wastewater stream. The reactor may contain a packing material to which microorganisms may affix. The packing media may be random, such as pall rings, or an oriented packing, such as packing material marketed under the trademarks Vinyl Core and Koro-Z.

Generally, reactor designs can be divided into two types based on the flow characteristics of the contained liquid. In an upflow reactor, wastewater generally enters from a lower bottom area of a closed reaction vessel and moves upward. Methane and carbon dioxide gases also move upward with the liquid and partition from the liquid phase into the gas phase as the gases approach the surface as a function of pressure differential and partition coefficients. Finished liquid is removed from the top of the liquid level. The top of the vessel defines a closed hood area substantially free of liquid for the collection of the gases.

In a downflow reactor, wastewater generally enters from the top of the reactor and moves downward. Methane and carbon dioxide gas move against the liquid current in an upward movement. However, the movement of the liquid in a downward direction and the ever increasing pressure as depth increases tends to retain soluble gases in the liquid to form an acid buffered liquor. Again, the top of the vessel defines a closed hood area substantially free of liquid for the collection of gases.

In both upflow and downflow systems, effluent leaving the anaerobic reactor is passed through a degassifier and into a settling tank. Methane gas is recovered and is used as an energy source. Sludge produced in the process falls to the bottom of a settling tank and is either recirculated, or further processed for final disposition.

Normally, when the reactor is in operation, the anaerobic process produces carbon dioxide. The carbon dioxide produced by the anaerobic reaction creates a partial pressure which causes the carbon dioxide to dissolve into the aqueous medium and form carbonic acid. The formation of carbonic acid and, in the case of carbohydrate type wastes, the formation of acetic acid, may cause the pH to drop within the reactor vessel requiring the addition of caustic soda to maintain the reactor at a normal operating pH of 6.8 or greater. The absence of buffering in high strength wastewater creates a constant demand for caustic soda. The addition of caustic soda can be the most expensive feature of operating an anaerobic process.

A downflow reactor design may further contribute to a build-up of acidic conditions within the reactor. The continued metabolism of organic material may contribute to a pH gradient within the vessel. Areas toward the bottom of the reactor, under the influence of pressure due to the depth of the liquid, and away from any means to vent carbon dioxide, may have greater concentrations of carbonic acid.

The problem of acid formation within the reactor vessel is further compounded when the wastewater feed is acidic in itself. Indeed, several industrial processes may produce organic acids and other organic wastes of limited solubility in the wastewater stream in which they are suspended. By way of example without limitation, the production of terephthalic acid for use in the plastic industries results in a waste containing acetic acid, benzoic acid, terephthalic acid, isophthalic acid, orthophthalic acid, p-toluic acid, trimellitic acid, 4-carboxybenzaldehyde and hydroxymethylbenzoic acid. Some of these aromatic acids may exist in waste streams in concentrations greater than their solubility. When present, aromatic acids may cause an acidic feed and must be neutralized prior to degradation. Entering a reactor having a low pH, the aromatic acids may precipitate from the solution reducing the effectiveness of the anaerobic process in metabolizing the organic constituents of the wastewater stream.

The areas toward the bottom of the reactor, with the high levels of carbonic acid, are potential sources of base with the removal of the carbonic acid. Thus, assuming that the contents of the reactor are buffered to an approximately neutral pH, removal of carbonic acid or carbon dioxide will produce a basic liquor available to neutralization incoming acid feed.

Further, the raw feed from many industrial processes is unsuitable for biological decomposition due to temperature constraints. In a typical process, feed from industrial processes is maintained in retention ponds to provide a steady pool or reservoir of feed for the anaerobic process. The retention ponds are further equipped with aeration means, including sprayers or descending baffles, in order to bring the high temperature raw feed from industrial processes to substantially ambient temperature.

The control of temperature and pH in anaerobic processes is energy intensive and costly. Some upflow reactors appear to recycle the finished liquor from the reactor, which has a substantially neutral pH, to buffer incoming wastewater streams. See U.S. Pat. No. 4,568,464 issued Feb. 4, 1986 to Blay et al.; United Kingdom Patent Application No. 19176/75 published Jan. 26, 1977 to Witt et al.; and "Anaerobic Filter Cuts Costs, Generates Energy" Chemical Week, 42, May 23, 1979.

Some downflow reactor systems appear to use a system of recycle to promote an even distribution of liquid throughout the reactor. U.S. Pat. No. 4,311,593 issued Jan. 19, 1982 to Benjes, et al.

U.S. Pat. No. 4,530,767 to Love, describes a method of air stripping carbon dioxide from an upflow reactor process utilizing a reactor hood.

U.S. Pat. No. 3,981,800 to Ort and U.S. Pat. No. 3,939,066 to Bauer describe a method of stripping carbon dioxide from an anaerobic process utilizing pressure release.

U.S. Pat. No. 3,980,556 to Besik describes a method of air stripping nitrogen gases from the activated sludge and recycle of the regenerated material to the reactor.

U.S. Pat. No. 4,375,412 to Schimel describes a method of withdrawing nitrogen gases under the influence of a vacuum.

However, these references do not teach or suggest methods and apparatus for the anaerobic processing of acid wastes of limited solubility, controlling pH, and controlling the temperature.

SUMMARY OF THE INVENTION

The present invention features a process and apparatus for reducing and controlling the acid concentration in an anaerobic process stream, promoting the dissolution of acidic constituents of limited solubility, and controlling the temperature of incoming reactor feed.

One embodiment of the present invention includes an anaerobic process. The process includes the steps of anaerobically degrading a substrate in an anaerobic medium in which anaerobic metabolism produces a gaseous compound capable of dissolving in the medium to form an acid buffered liquor. At least a portion of the acid buffered liquor is contacted with a substantially inert gas to withdraw the gaseous compound. The liquor is available for further processing including reintroduction into the reactor.

Preferably, the liquor is combined with at least a part of a feed-containing substrate to form a liquor feed mixture. Where the substrate includes an organic acid of limited solubility, the withdrawal of the gaseous compound promotes dissolution of the organic acid.

In the case where the gaseous components contributing to acid conditions in the anaerobic reactor include carbon dioxide, the chemistry of contacting a portion of the acidic liquor with the substantially inert atmosphere can be summarized by the series of equations, designated S1 and S2, set forth below:

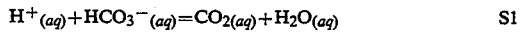

Thus, stripping the acid liquor of carbon dioxide reduces the hydrogen ion concentration.

The hydrogen ion concentration is also related to the solubility of organic acids contained in the wastewater streams of many industrial processes. The equations of the solid organic acids entering into solution can be summarized in the set of equations, designated D1, D2 and D3, set forth below:

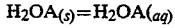

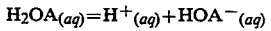

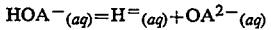

In the above equations, OA represents an organic acid and may include by way of example without limitation, aromatic acids such as benzoic acid, toluic acid, terephthalic acid, isophthalic acid, orthophthalic acid, trimellitic acid, pyromellitic acid, 4-carboxybenzaldehyde, hydroxymethylbenzoic acid, t-butylisophthalic acid, pyromellitic acid, 1,2,4,5-benzenetetracarboxylic acid and phenylindane dicarboxylic acid.

Equation S1 is a function of pH and equilibrium is expected to be established virtually instantaneously. Equation S2, however, involves a phase change and is expected to be rate controlling. To the extent one can vent carbon dioxide gas from an acidic liquor, one can control the hydrogen ion concentration related to the formation of carbonic acid.

The second set of equations, related to the dissolving function, are also related to pH. Equations D2 and D3 are functions of pH and equilibrium is expected to be established virtually instantaneously. Equation D1 involves a phase change and is expected to be rate controlling in the dissolving process, limited primarily by the characteristics of the particles. However, the principal driving force is provided by the pH of the solution which can be altered by stripping carbon dioxide gas from an acidic mixture containing the solid organic acid.

An embodiment of the present invention includes the use of methane as a substantially inert gas. Thus, one embodiment includes contacting the mixture of organic substrate and reactor effluent with methane in a substantially closed environment. First, methane produced by the anaerobic process is stripped of carbon dioxide and then brought into contact with the combined organic substrate and reactor effluent. The carbon dioxide partitions into the methane gas and the methane and carbon dioxide gas is available for further processing.

An embodiment of the present invention facilitates removal of carbon dioxide gas from the mixture of organic substrate and reactor effluent. The embodiment features contacting the reactor effluent, which is rich with carbon dioxide, with feed from an industrial process having a temperature greater than ambient temperature. The elevated temperature facilitates removal of carbon dioxide, driving it out of the mixture.

Mixing the lower temperature effluent with the higher temperature feed produces a mixture of intermediate temperature. A further lowering of the temperature of the mixture is achieved by bringing the mixture in contact with substantially inert gas. In a closed system, the gas may include methane obtained as a reaction product of the anaerobic process. However, a closed system is not necessarily required for all applications.

An embodiment of the present invention features a process to control the temperature of feed flowing to an anaerobic reactor. The method includes a step wherein the mixture of organic substrate and reactor effluent can be brought into contact with a substantially inert gas by suitable means including spraying the mixture in the presence of air, flowing the mixture over a series of baffles in the presence of air, and bubbling air through the mixture. The temperature of the mixture is controlled by increasing or decreasing the amount of contact the inert gas has with the mixture.

Preferably, gases used to strip carbon dioxide or to cool hot feeds are gases which do not substantially interfere with anaerobic processes or can be isolated or removed from the anaerobic processes, do not enter into solution readily, or react with the substrate in a manner which may make the substrate less biodegradable. Preferred gases include methane and atmospheric air.

An embodiment of the present invention includes stripping carbon dioxide from the combined methane-carbon dioxide discharge of the anaerobic reactor to produce a quantity of methane for use as a substantially inert gas. First, methane and carbon dioxide gases are separated by removing carbon dioxide in a manner known in the art, such as pressure in presence of water, or caustic addition. Next, the methane is brought into contact with the effluent to remove carbon dioxide. The methane carbon dioxide mixture is available for further processing including recycling to strip the carbon dioxide or for use as a source of energy.

Embodiments of the present invention also feature apparatus for reducing or controlling acid concentration in an anaerobic process stream promoting the dissolution of acidic constituents of limited solubility and controlling the temperature of incoming feed.

One embodiment of the present invention includes an apparatus having an anaerobic reactor adapted to digest an organic substrate in a process which generates gaseous compounds capable of dissolving a liquor. The anaerobic reactor further includes receiving means, including piping for introducing the organic substrate into the reactor. The reactor also includes discharge means, including piping, for removing wastewaters from the reactor. The apparatus further comprises a stripper-dissolver in communication with the reactor receiving means and said reactor discharge means. The stripper-dissolver is adapted to receive wastewater feed and reactor effluent and bring the effluent into contact with a substantially inert gas to allow dissolved gaseous compounds to partition into the substantially inert gas. The stripper-dissolver in communication with the reactor receiving means is adapted to discharge an effluent-feed mixture into the reactor.

Embodiments of the present invention provide a method and apparatus which reduce the use of caustic to maintain an operating pH in an anaerobic process stream. Caustic usage may be reduced by 40 to 60 percent and the carbon dioxide in the off gas reduced from approximately 30 to 20 percent without affecting the performance of the anaerobic process.

Embodiments of the present invention are particularly well-suited for downflow reactors which tend to accumulate or develop a gradient of carbon dioxide-carbonic acid due to pressure effects and the flow of the liquor. A portion of the reactor effluent from the bottom of the reactor is shunted to the stripper-dissolver. In concentrating carbon dioxide in the effluent, less carbon dioxide is vented with methane, making the methane more valuable as an energy source.

One embodiment of the present invention features a stripper-dissolver which includes a containment vessel. The vessel includes receiving means for receiving effluent from an anaerobic reactor. The vessel further includes discharge means for removing effluent from the vessel. The vessel further includes gas receiving means for receiving a substantially inert gas within the vessel. Finally, the vessel includes gas and liquid mixing means in communication with the gas receiving means and/or the receiving means for the effluent. By way of example, without limitation, one embodiment of the present invention includes a sprayer in communication with the effluent receiving means, a gas aeration system including a blower and vents in communication with the gas receiving means, an air or gas stone in communication with the gas receiving means wherein the stone is submerged in effluent and contained within the vessel, a series of baffles in communication with the receiving means for effluent which increase the degree of contact with gas entering the vessel or any combination of the above system.

A preferred embodiment includes a stripper-dissolver having feed receiving means, including piping, which is adapted to mix feed with effluent to promote the dissolution of substrate as carbon dioxide is removed from the effluent.

A preferred embodiment of the present invention also includes a reactor and a stripper-dissolver in which the reactor includes means for recovering methane. Further, the stripper-dissolver includes means for receiving the methane in communication with the gas receiving means for use in stripping carbon dioxide from an effluent from the reactor.

Embodiments of the present invention are suited for controlling temperature of a wastewater stream entering a reactor and facilitate the stripping of carbon dioxide. Thus, contacting effluent with a feed having an elevated temperature tends to drive off carbon dioxide from the effluent in addition to moderating the temperature of the mixture. In addition, the intimate contact of the effluent-feed mixture with a substantially inert gas allows substantial cooling of the mixture which can be regulated by the degree of contact between the gas and liquid. By way of example without limitation, cooling may be increased by increasing the flow of gas through the stripper-dissolver.

Features of the present invention are particularly suited for downflow reactors which may have large carbon dioxide-carbonic acid concentrations in the lower areas of the reactor. Further, downflow reactors tend to remove carbon dioxide in the effluent so as to make the methane produced by the anaerobic process more available as an energy source. Embodiments of the present invention which feature a nonclosed system for stripping carbon dioxide from effluent, also feature evaporative functions which may reduce the fluid volume of the wastewater stream.

These and other features will become apparent from the drawings and the detailed discussion which follow which, by way of example, without limitation, describe preferred embodiments of the present invention.

BRIEF DESCRIPTION OF THE DRAWING

FIG. 2 is a plot of carbon dioxide removal vs. recycle ratio.

DETAILED DESCRIPTION OF THE DRAWING

Figure 1:
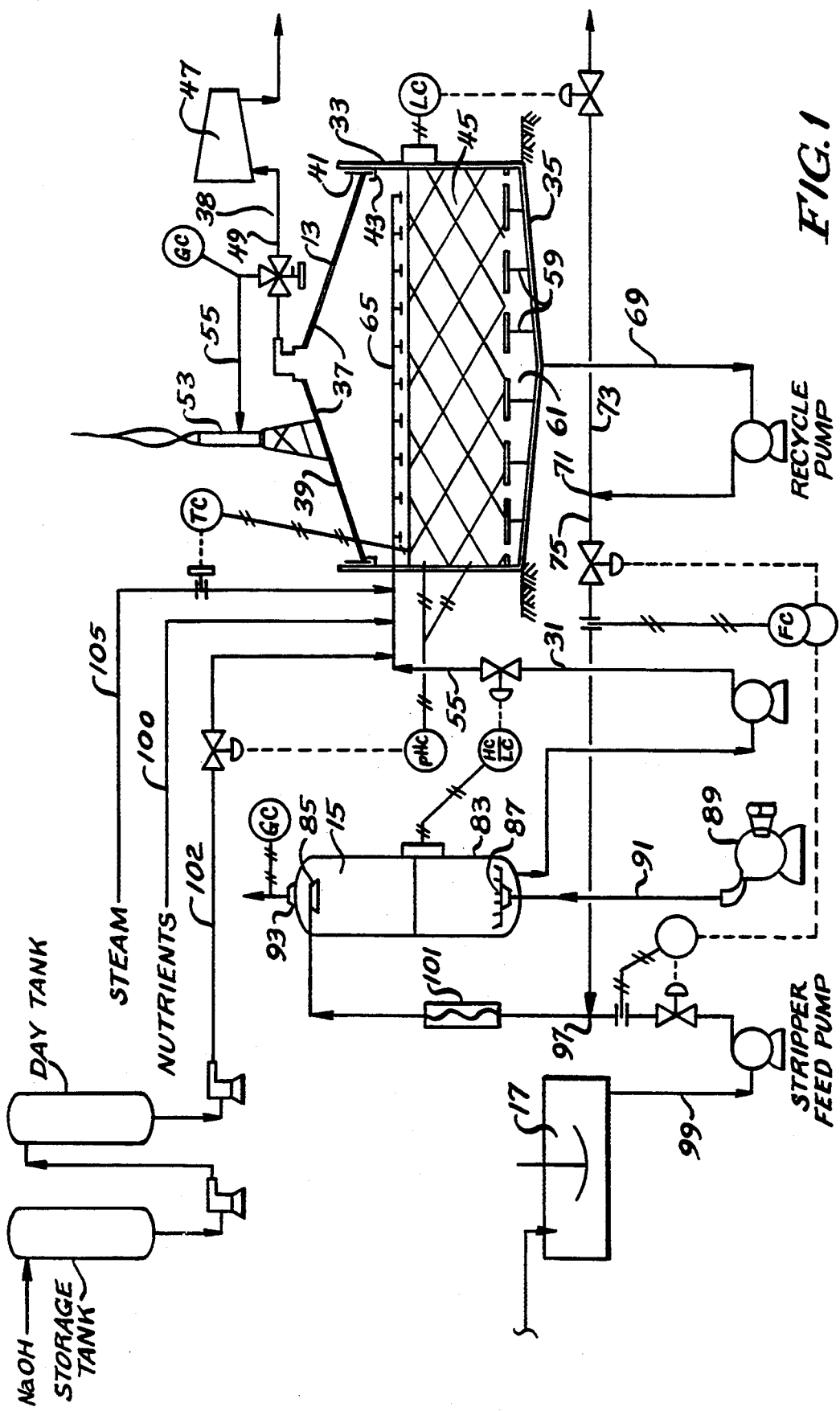
FIG. 1 shows an anaerobic wastewater treatment system.

Turning now to FIG. 1, an anaerobic wastewater treatment system generally designated by 11 is illustrated in schematic form. The anaerobic wastewater treatment system 11 is comprised of two major components: an anaerobic reactor 13 and a stripper-dissolver 15.

Anaerobic reactor 13 receives wastewater feed from the stripper-dissolver 15 through a conduit 31. The waste may include organic acids such as carboxylic acids, ascorbic, acetic, propionic, acrylic, glycollic, maleic, adipic, benzoic, butyric, valeric, hydracrylic, glyceric, succinic, fumaric, glutaric, phthalic, isophthalic, terephthalic, t-butylisophthalic, pyromellitic, 1,2,4,5-benzenetetracarboxylic and phenylindane dicarboxylic; as well as other organic alcohols, ketones, esters, aldehydes and phenols. The organic acids entering the reactor may have limited solubility.

These acidic organic substrates are received by the reactor where they are metabolized by a consortium of bacteria including bacillus, pseudomonas chlororaphis, pseudomonas aeruginosa, bacillus amyloliquefaciens, various staphylococcus species, desulfovibrio, aerococcus species, aeromonas species, staphylococcus aureus, lactobacillus ruminis, methanobacterium formicicum, and methalobacterium mobile.

During the digestion of the organic materials within the reactor, the consortium of bacteria produce methane and carbon dioxide. The carbon dioxide is able to react with water to form carbonic acid.

The reactor 13 is a substantially closed containment vessel. The reactor 13 includes a substantially cylindrical vertical wall 33, a bottom wall 35 and a floating roof collector 37.

The floating roof collector 37 is part of a gas collection system 38. The floating roof collector 37 is frustoconical in shape having radially downwardly sloping surfaces 39. The outer radial edge of the floating roof collector 37 extends vertically forming a vertical flange 41 which sealably engages the inner cylindrical wall 33. Vertical flange 41 rests within an interfitting cooperating lip 43 projecting radially inwardly from the cylindrical wall 33.

Methane gas, produced during the anaerobic digestion of organic materials in the reactor, floats upward through the aqueous liquor contained within the vessel and is collected within the void area defined by floating roof gas collector 37. The floating roof gas collector 37 is capable of changing its volume by moving upward along the cylindrical wall 33 to accommodate additional volumes of methane gas.

Methane gas within the floating roof gas collector 37 is in communication with a compressor 47 by means of a conduit 49 and control valve 51 which are all part of the gas collection system 38. In the event that the methane gas must be removed from the gas collection system 38, the system 38 includes a control valve 51 in communication with a safety flare 53 by means of a conduit 55. The safety flare 53 allows excess methane to be burned off.

The interior of the anaerobic reactor 13 contains a packing material 45 having a substantial surface area for the attachment and growth of a bacterial consortium. Such media may include randomly oriented materials such as rock or pall rings or oriented material such as bundles or blocks of polyvinyl plastic sold under trademarks Vinyl Core and Koro-Z. The packing material 45 is supported upon a reactor frame 59 providing a void area 61 for the collection of substantially purified effluent.

Wastewater enters the reactor 13 through wastewater receiving means, including reactor-influent conduit 31 and distribution network 65 which distributes the incoming wastewaters substantially uniformly over the upper area of the packing material 45. Thus, incoming wastewater is introduced to the top of the packing material 45, flows through the packing material 45 and downwardly providing anaerobic bacteria attached to the packing media 45 an opportunity to metabolize and digest the organic substrate carried within the aqueous solution. Wastewater continues its downward movement through the reactor 13 into the void area 61 and is removed from the reactor by wastewater discharging means including reactor effluent conduit 69.

A portion of the reactor effluent exits the reactor through conduit 69 to a junction 71 which splits the reactor effluent into two pathways. One pathway, represented by conduit 73, leads to further process steps or discharge to the general environment. By way of example, without limitation, conduit 73 may lead to an aerobic biox system to complete the degradation of organic waste material. The aerobic biox system may also include further polishing steps using sludge retaining ponds, or the like.

The second pathway, represented by conduit 75 takes a portion of the reactor effluent to the stripper-dissolver 15. Effluent from the reactor 13, carried by conduit 75, is rich in carbon dioxide.

Generally, the degradation of aromatic acids does not give rise to substantially lower pH values in the reactor than the incoming feed because as carbonic acid is formed the aromatic acids disappear. The rate limiting step, in the degradation of aromatic acids, is the initial steps in attacking the ring structure. There is no appreciable buildup of other acidic intermediaries or by-products.

In contrast, the degradation of carbohydrate laden waste may give rise to lower pH values in the reactor than the incoming feed. The higher acid concentration of the processed wastes can be attributed to a number of factors. The carbohydrate type waste is essentially neutral and complete metabolism causes the production of an acid forming substance, carbon dioxide. Further, the initial degradation of carbohydrate proceeds rapidly to intermediates which are slower to metabolize. These intermediates may include acidic compounds such as acetic acid.

The stripper-dissolver 15 utilizes the effluent from the reactor 13, which effluent is buffered with carbonic acid at approximately pH 7, as a neutralizing agent for acidic wastes. In one embodiment, a portion of the effluent from reactor 13 is directed to the stripper-dissolver 15. The stripper-dissolver 15 is adapted to receive the effluent and bring the effluent into contact with a substantially inert gas.

The stripper-dissolver 15, as illustrated, includes a vessel 83 adapted to receive liquids including effluent from reactor 13. Means for bringing effluent into contact with an inert gas include a sprayer 85, aerator 87 and a series of cascading baffles (not shown).

The sprayer 85 is in communication with reactor 13 by means of conduits 75 and 69. Sprayer 85 is adapted to receive a liquid and disperse the liquid into an inert gas within vessel 83.

Aerator 87 is adapted to receive a substantially inert gas and disperse the gas within a liquid including reactor effluent contained within vessel 83. Aerator 87 is in communication with a blower 89 by means of a duct 91.

Blower 89 may draw atmospheric air; however, in a closed system, it may be advantageous to feed aerator 87 with methane via ducts (not shown) in communication with the gas collection system 38. Preferably, in the situation where methane is used as the inert gas, the aerator 89 is in communication with compressor 47 and a carbon dioxide stripper (not shown). Carbon dioxide can be stripped from methane or other gases by a variety of methods including pressurizing the mixture of gases in the presence of water in a manner known in the art or with the addition of a caustic.

The stripper-dissolver 15 further includes means for discharging gases from vessel 83 including vent 93. In an open system, vent 93 may be open to the atmosphere as illustrated. In a closed system, vent 93 is in communication with the methane collection system 38 of reactor 13 by suitable means including ducts (not shown).

Effluent comes into contact with the substantially inert gas in the stripper-dissolver 15. Carbon dioxide carried by the effluent partitions into the gas phase raising the pH of the remaining liquid. The remaining liquid can be discharged from stripper-dissolver 15 via a discharge conduit 31 for further processing including returning the liquid to the reactor 13.

An embodiment of the present invention includes a stripper-dissolver 15 adapted to receive fresh feed from industrial processes. As illustrated, conduit 75 leading to the stripper-dissolver 15 includes a junction 97 for receiving fresh feed from industrial processes from a feed conduit 99. Feed conduit 99 may be in direct communication with industrial processes or may receive wastes from holding basins. To facilitate mixing of the fresh feed with effluent from the reactor, conduit 75 includes a line mixer 101.

The mixture of feed and effluent is received by the stripper-dissolver 15 which removes carbon dioxide and raises the pH of the mixture. In the situation where aromatic acids of limited solubility are contained in the mixture, raising the pH of the mixture forces the solids into the solution.

Individuals skilled in the art will recognize that the feed may be mixed with effluent prior to the removal of carbon dioxide or after the removal of carbon dioxide. However, where the feed is of elevated temperature relative to the effluent, mixing of the feed with the effluent prior to the removal of carbon dioxide facilitates stripping by driving off the carbon dioxide.

By way of example, whereas the pH of incoming feed in industrial processes for the production of terephthalic acid may be 4.0 to 4.5, and incoming pH of the reactor effluent may be approximately 7, the outgoing mixture from the stripper-dissolver 15 to the reactor 13 is substantially neutral ranging from pH 6 to pH 7.5.

Assuming gas and liquid phases in the reactor 13 and the stripper dissolver are in equilibrium, a mathematical model of stripper dissolver performance can be developed wherein $$E = 1 - \left[ \frac{(1 + H_r/K_c)(B - 1 + X)}{nx} + \frac{(B - 1 + X)A(H_r)}{(K_c)(K_h) - A(H_r)(B - 1 + X)} \right];$$

$$Z = \frac{nEX + (1 + H_s/K_c)/(1 + H_s/K_a)}{(1 + H_r/K_c)(B - 1 + X) - (1 - H_s/K_c)\left[ B - \frac{(1-x)}{(1 + H_s/K_a)} \right]}; \text{ and}$$

-continued
$$P = \frac{ZAH_r(B - 1 + X)(1 + K_c/H_r) - nEXAK_c}{(Z + 1) K_h K_c(1 + K_c/H_s)}$$

As used above, the following terms are defined as set forth below:

A is the acid normality in the wastewater feed.
B is the ratio of base in the reactor 13 to acid in the wastewater feed. B can be expressed as the ratio of sodium ion concentration in the reactor 13 over the acid concentration in the feed.
E is the fraction of carbon dioxide produced in the reactor 13 which is withdrawn in the stripper-dissolver 15.
$H_r$ is the hydrogen ion concentration in the reactor 13.
$H_s$ is the hydrogen ion concentration in the stripper-dissolver 15.
$K_a$ is the feed acid equilibrium constant.
$K_c$ is the carbonic acid equilibrium constant.
$K_h$ is the Henry's Law constant for carbon dioxide.
n is the moles of carbon dioxide produced per acid equivalent digested.
P is the equilibrium carbon dioxide partial pressure of the gas in the stripper-dissolver 15.
X is the fractional acid conversion in the reactor 13.
Z is the ratio of effluent flow to the feed flow to the stripper-dissolver 15.

FIG. 2 illustrates the operating conditions necessary to achieve specific carbon dioxide removals. The relationship of Z, the ratio of effluent flow to feed flow to the stripper-dissolver 15; to P, the equilibrium carbon dioxide partial pressure of the gas in the stripper-dissolver 15 is plotted for differing values of E, the fraction of carbon dioxide produced which is withdrawn in the stripper-dissolver 15. The relationships illustrated in FIG. 2 are based on wastewater comprising acetic acid as its main constituent with a $K_a$ of $1 \times 19^{-4.76}$. In FIG. 2, A is assumed to equal 0.08N, B is 0.1277, $H_r$ is $1 \times 10^{-7}$, $K_c$ is $1 \times 10^{-6.46}$, $K_h$ is $10^{-1.57}$M/ATM n is 1.66, X is 0.85 and $H_r$ is $1 \times 10^{-7}$M.

The point values of FIG. 2 are the pH values of the stripper at the particular Z and E values shown. The curves for the various values of E tend to go through maxima which suggest points of recycle ratios, Z, and carbon dioxide partial pressure, P, where the stripper-dissolver is most efficient. Methane losses at higher values of E suggest that lower values of E between about 0.25 to 0.50 are advantageous. Thus, a preferred recycle rate exists from approximately 1 to 6, and more preferably from approximately 1.5 to 4.

The stripping of carbon dioxide from a portion of the effluent from the reactor and mixing the stripped effluent with fresh feed reduces caustic requirements 20%–40%.

An embodiment of the present invention further allows the temperature of the feed-effluent mixture to be controlled. By way of example, the temperature of wastewater from industrial processes for the manufacture of terephthalic acid may range from 130°–140° F. A temperature of liquid entering the reactor 13 of approximately 100° F. is desired.

The mixing of the effluent with fresh feed causes a reduction in temperature. A further reduction in temperature results from contacting the liquid in the stripper-dissolver 15 with an inert gas. Indeed, atmospheric gas can be blown through the stripper-dissolver 15 through aerator 87 as required to lower the temperature of the feed effluent mixture. The control of temperature in the stripper-dissolver 15 obviates further devices and method steps including sprayers and holding basins upstream from the reactor 13.

One preferred embodiment of a stripper-dissolver 15 for an open system conforms generally with a cooling type tower adapted to receive a mixture of effluent and feed. A preferred cooling tower is a Series V cooling tower, model T1000 by Baltimore Aircool.

An embodiment of the present invention permits the addition of nutrients and caustic agents if required to supplement pH control and provide the microorganisms in the reactor 13 with appropriate growth factors. Nutrients and caustic agents are added via conduits 100 and 102 respectively in communication with stripper-dissolver discharge conduit 31.

A steam conduit 105 in thermal communication with stripper-dissolver discharge conduit 31 is adapted to heat conduit 31 and its contacts to provide further thermal control of material entering reactor 13.

Preferred embodiments of the present invention provide valves and pH, temperature, flow, material and vessel liquid level sensors to monitor and control the system in a manner known in the art.

Preferred embodiments of the present invention also include pumps and compressing equipment for the movement of liquids and gas in a manner known in the art.

Thus, while preferred embodiments have been illustrated and described, it is understood that the present invention is capable of variation and modification and, therefore, should not be limited to the precise details set forth, but should include such changes and alterations that fall within the purview of the following claims.

We claim:

1. An apparatus for an anaerobic process comprising an anaerobic reactor and a stripper-dissolver wherein said anaerobic reactor is adapted to receive a waste stream from said stripper-dissolver and to digest organic substrate from said waste stream in a process which generates gaseous compounds capable of dissolving into a liquor, and comprising reactor discharge means in communication with said stripper-dissolver for removing at least a portion of said liquor; and wherein said anaerobic reactor further comprises gas recovery means in communication with said stripper-dissolver to direct gas from said anaerobic reactor into said stripper-dissolver; and wherein said stripper-dissolver is adapted to receive said liquor from said reactor discharge means and to receive fresh waste feed for mixing with said liquor to produce said waste stream, and further is adapted to bring said waste stream into contact with a substantially inert gas to allow said gaseous compounds to partition into said substantially inert gas, and comprises stripper discharge means in communication with said anaerobic reactor for conveying at least a portion of said waste stream into said anaerobic reactor.

* * * * *

UNITED STATES PATENT AND TRADEMARK OFFICE
CERTIFICATE OF CORRECTION

PATENT NO.: 5,419,833

DATED: May 30, 1995

INVENTOR(S): Stephen R. Ely, George P. Olsen

It is certified that error appears in the above-identified patent and that said Letters Patent is hereby corrected as shown below:

| Col. | Line | | |
|---|---|---|---|
| 4 | 5 | "$HOA^-_{(aq)} = H^=_{(aq)} + OA^{2-}_{(aq)}$" should read --$HOA^-_{(aq)} = H^+_{(aq)} + OA^{2-}_{(aq)}$-- | |
| 10 | 38 | "with a $K_a$ of $1 \times 19^{-4.76}$." should read --with a $K_a$ of $1 \times 10^{-4.76}$.-- | |

Signed and Sealed this

Twenty-first Day of May, 1996

Attest:

BRUCE LEHMAN

Attesting Officer

Commissioner of Patents and Trademarks